United States Patent
Lee et al.

(10) Patent No.: US 11,138,962 B2
(45) Date of Patent: Oct. 5, 2021

(54) DISPLAY APPARATUS

(71) Applicant: LG Display Co., Ltd., Seoul (KR)

(72) Inventors: JaiHyuk Lee, Paju-si (KR); KiDuk Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/686,792

(22) Filed: Nov. 18, 2019

(65) Prior Publication Data
US 2020/0184939 A1    Jun. 11, 2020

(30) Foreign Application Priority Data

Dec. 5, 2018   (KR) .................. 10-2018-0155198

(51) Int. Cl.
| | | |
|---|---|---|
| *G10K 9/122* | (2006.01) | |
| *G06F 1/16* | (2006.01) | |
| *G06F 3/16* | (2006.01) | |

(52) U.S. Cl.
CPC .......... *G10K 9/122* (2013.01); *G06F 1/1605* (2013.01); *G06F 1/1626* (2013.01); *G06F 3/16* (2013.01)

(58) Field of Classification Search
CPC .... H04R 17/00; H04R 1/028; H04R 2499/15; H04R 7/045; H04R 1/288; H04R 1/403; H04R 3/12; G02B 27/0075; G02B 7/38; H04N 5/23212; B06B 1/0607; G01B 7/282; G01H 1/003; G01N 29/14; G01N 29/2412; G06F 1/1605; G06F 1/1626; G06F 1/1652; G06F 3/016; G06F 3/16; G08B 6/00; G10K 9/122; H02K 15/165

USPC ... 340/384.5, 815.48, 815.46, 384.6, 426.15, 340/568.8, 692, 691.6

See application file for complete search history.

(56) References Cited

U.S. PATENT DOCUMENTS

| | | | |
|---|---|---|---|
| 9,740,288 B2* | 8/2017 | Hiraoka | G06F 1/1656 |
| 2005/0025330 A1 | 2/2005 | Saiki et al. | |
| 2006/0288787 A1* | 12/2006 | Mistry | G01N 29/14 |
| | | | 73/660 |
| 2011/0285652 A1* | 11/2011 | Imamura | G06F 1/1662 |
| | | | 345/173 |

(Continued)

FOREIGN PATENT DOCUMENTS

| | | |
|---|---|---|
| CN | 1581891 A | 2/2005 |
| CN | 105096778 A | 11/2015 |

(Continued)

OTHER PUBLICATIONS

Office Action dated May 21, 2021, issued in corresponding Chinese Patent Application No. 201911133509.2.

*Primary Examiner* — Daniel Previl
(74) *Attorney, Agent, or Firm* — Morgan, Lewis & Bockius LLP

(57) ABSTRACT

A display apparatus includes a display module including a display panel configured to display an image and a first sound generating device on a rear surface of the display panel, the first sound generating device including a first vibration generating device and a second vibration generating device adjacent to the first vibration generating device, the first vibration generating device is configured to vibrate a center region of the first sound generating device based on a signal applied to the first sound generating device, and the second vibration generating device is configured to vibrate a periphery of the display panel based on the applied signal.

23 Claims, 8 Drawing Sheets

(56) References Cited

U.S. PATENT DOCUMENTS

| | | | |
|---|---|---|---|
| 2015/0084902 A1* | 3/2015 | Atsumi | G06F 1/1684 |
| | | | 345/173 |
| 2015/0085179 A1* | 3/2015 | Van Heugten | G02B 27/0075 |
| | | | 348/349 |
| 2015/0086055 A1* | 3/2015 | Kato | H04R 1/02 |
| | | | 381/334 |
| 2015/0341714 A1* | 11/2015 | Ahn | G06F 1/1688 |
| | | | 381/333 |
| 2016/0202764 A1* | 7/2016 | Kamata | G06F 3/04883 |
| | | | 715/702 |
| 2016/0345932 A1* | 12/2016 | Miyazawa | A61B 8/461 |
| 2017/0280246 A1* | 9/2017 | Choi | H04R 9/06 |
| 2018/0198052 A1* | 7/2018 | Park | G06F 3/016 |
| 2018/0317011 A1 | 11/2018 | Choi et al. | |
| 2019/0200111 A1* | 6/2019 | Kang | H04R 1/028 |
| 2019/0208299 A1* | 7/2019 | Kim | H04R 17/00 |

FOREIGN PATENT DOCUMENTS

| | | |
|---|---|---|
| CN | 106502329 A | 3/2017 |
| CN | 107371109 A | 11/2017 |
| CN | 108337618 A | 7/2018 |
| CN | 108810760 A | 11/2018 |

* cited by examiner

DISPLAY APPARATUS

CROSS-REFERENCE TO RELATED APPLICATIONS

This application claims the benefit and priority to Korean Patent Application No. 10-2018-0155198, filed on Dec. 5, 2018, the entirety of which is incorporated herein by reference.

BACKGROUND

Technical Field

The present disclosure relates to a display apparatus.

Discussion of the Related Art

Display apparatuses are equipped in home appliances or electronic devices, such as televisions (TVs), monitors, notebook computers, smartphones, tablet computers, electronic organizers, electronic pads, wearable devices, watch phones, portable information devices, navigation devices, and automotive control display apparatuses, and are used as a screen for displaying an image. Display apparatuses include a display panel for displaying an image and a sound device for outputting a sound associated with the image.

Recently, in display apparatuses, there is a trend of enlarging a screen, but the requirements for weight-lightening and slimming are increasing. However, since display apparatuses should include a sufficient space into which a sound device such as a speaker for outputting a sound is embedded, it is difficult to weight-lighten and slim. Also, a sound generated by a sound device embedded into a display apparatus is output in a rearward direction or a sideward direction with respect to a body of the display apparatus, instead of a forward direction with respect to the display panel, and thus, does not travel toward a viewer (or a user) who is watching an image in front of the display apparatus, whereby an immersion experience of the viewer watching the image is hindered.

SUMMARY

Accordingly, embodiments of the present disclosure are directed to provide a display apparatus that substantially obviates one or more problems due to limitations and disadvantages of the related art.

Therefore, the inventors have recognized the above-described problems and have made various experiments so that when watching an image in front of a display panel, a traveling direction of a sound becomes a direction toward a front surface of the display panel, and thus, sound quality is enhanced. Through the various experiments, the inventors have implemented a display apparatus having a new structure, which outputs a sound having a traveling direction that is a direction toward a front surface of a display panel, thereby enhancing sound quality.

An aspect of the present disclosure is to provide a display apparatus that vibrates a display panel to output a sound to a forward region in front of the display panel, thereby enhancing a sound.

Additional features and aspects will be set forth in the description that follows, and in part will be apparent from description or may be learned by practice of inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, a display apparatus comprises a display module including a display panel configured to display an image and a first sound generating device on a rear surface of the display panel, wherein the first sound generating device includes a first vibration generating device and a second vibration generating device adjacent to the first vibration generating device, and the first vibration generating device is configured to vibrate a center region of the first sound generating device based on a signal applied to the first sound generating device and the second vibration generating device is configured to vibrate a periphery of the display panel based on the applied signal.

In another aspect, a display apparatus comprises a display module including a display panel configured to display an image and a first sound generating device on a rear surface of the display panel, wherein the first sound generating device includes a first vibration generating device and a second vibration generating device being configured to vibrate at a phase differing from a phase of the first vibration generating device.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this disclosure, illustrate embodiments of the disclosure and together with the description serve to explain the various principles of the disclosure.

Figure 1:
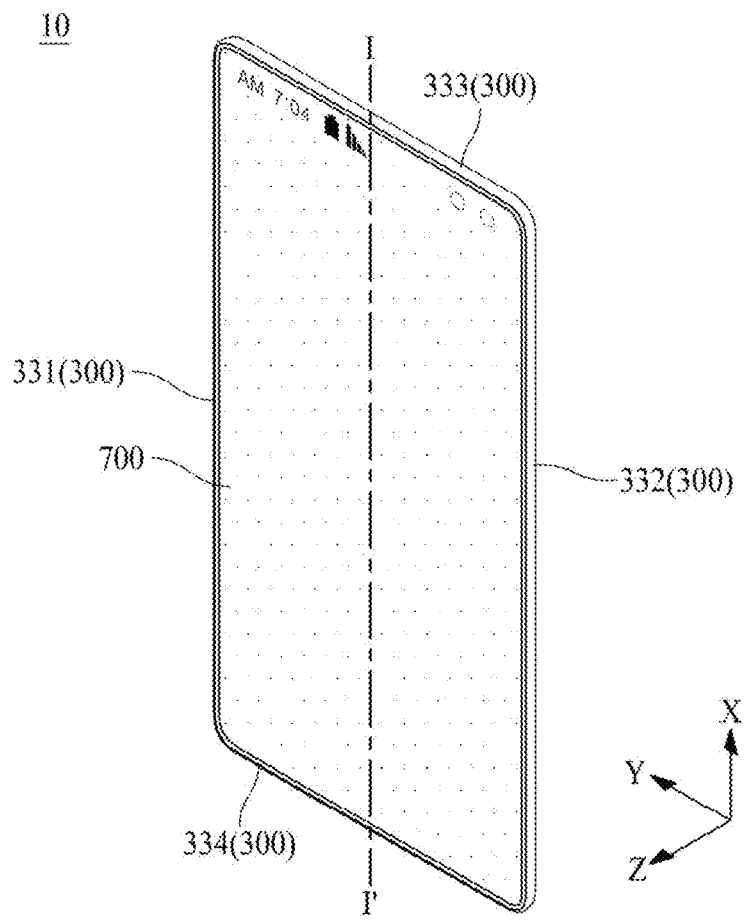
FIG. 1 is a perspective view illustrating a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to the embodiments of the present disclosure, examples of which are illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. In the following description, when the detailed description of the relevant known function or configuration is determined to unnecessarily obscure the important point of the present disclosure, the detailed description of such known function or configuration may be omitted. When terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range.

In describing a position relationship when a position relation between two parts is described as "on," "over," "under," and "next," one or more other parts may be disposed between the two parts unless a more limiting term, such as "just" or "direct(ly)" is used.

In describing a time relationship, for example, when the temporal order is described as "after," "subsequent," "next," and "before," a case which is not continuous may be included unless a more limiting term, such as "just" "immediate(ly)," or "direct(ly)" is used.

It will be understood that, although the terms "first," "second," may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as "first," "second," "A," "B," "(a)," "(b)," may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it can be directly on or directly connected to the other element or layer, or intervening elements or layers may be present. Also, it should be understood that when one element is disposed on or under another element, this may denote a case where the elements are disposed to directly contact each other, but may denote that the elements are disposed without directly contacting each other.

The term "at least one" should be understood as including any and all combinations of one or more of the associated listed items. For example, the meaning of "at least one of a first item, a second item, and a third item" denotes the combination of all items proposed from two or more of the first item, the second item, and the third element as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic device such as a notebook computer, a TV, a computer monitor, an equipment apparatus including an automotive apparatus or another type apparatuses for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set apparatus which is a final consumer apparatus or an application product including the LCM or the OLED module.

In some embodiments, an LCM or an OLED module including a display panel and a driver may be referred to as a narrow-sense display apparatus, and an electronic device which is a final product including an LCM or an OLED module may be referred to as a set apparatus. For example, the narrow-sense display apparatus may include a display panel, such as an LCD or an OLED, and a source printed circuit board (PCB) which is a controller for driving the display panel. The set apparatus may further include a set PCB which is a set controller electrically connected to the source PCB to overall control the set apparatus.

A display panel applied to an embodiment of the present disclosure may use any type of display panel, such as a liquid crystal display panel, an organic light emitting diode (OLED) display panel, and an electroluminescent display panel, but is not limited to a specific display panel which is vibrated by a sound generation device according to an embodiment of the present disclosure to output sound. Also, a shape or a size of a display panel applied to a display apparatus according to an embodiment of the present disclosure is not limited.

For example, if the display panel is the liquid crystal display panel, the display panel may include a plurality of gate lines, a plurality of data lines, and a plurality of pixels respectively in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel may further include a backing such as a metal plate attached on the display panel. However, embodiments are not limited to the metal plate, and the display panel may include another structure.

In the present disclosure, the display panel may be applied to vehicles as a user interface module such as a central control panel for automobiles. For example, the display panel may be provided between occupants sitting on two front seats in order for a vibration of the display panel to be transferred to the inside of a vehicle. Therefore, an audio experience in a vehicle is improved in comparison with a case where speakers are disposed on interior sides of the vehicle.

Hereinafter, embodiments of the present disclosure will be described in detail with reference to the accompanying drawings.

When a sound generating device is configured with only one vibration generating device, the present inventors have recognized that a sound pressure level is reduced in a high frequency domain and a low frequency domain. Therefore, the present inventors have performed various experiments for implementing a sound generating device where a sound pressure level is not reduced in the high frequency domain and the low frequency domain. Accordingly, by performing various experiments, the present inventors have invented a display apparatus including a sound generating device having a new structure for improving a sound pressure level in the high frequency domain and the low frequency domain.

Figure 2:
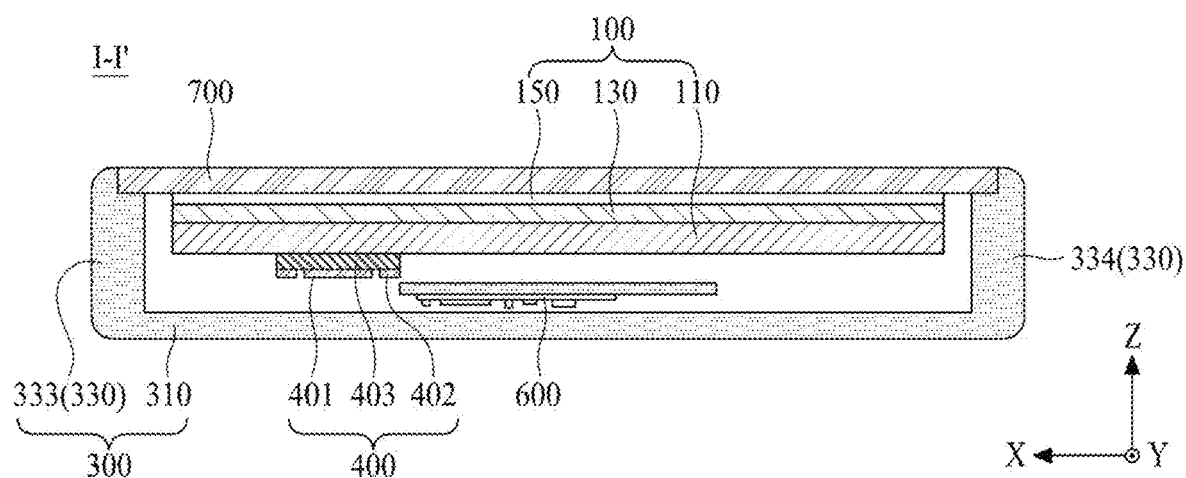
FIG. 2 is a cross-sectional view taken along line I-I' illustrated in FIG. 1.
Figure 3:
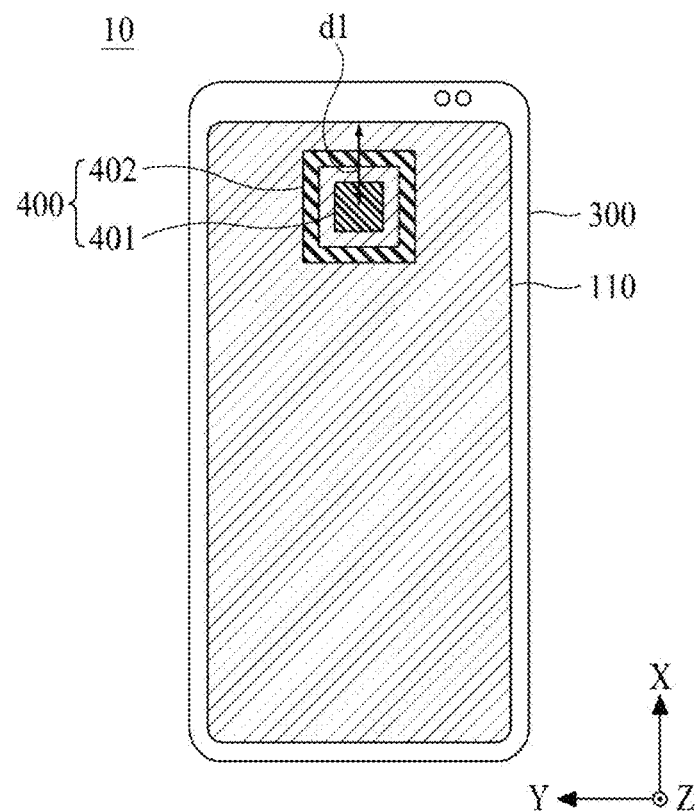
FIG. 3 is a rear view of a display panel illustrated in FIG. 1.

FIG. 1 is a perspective view illustrating a display apparatus according to an embodiment of the present disclosure. FIG. 2 is a cross-sectional view taken along line I-I' illustrated in FIG. 1. FIG. 3 is a rear view of a display panel illustrated in FIG. 1.

With reference to FIGS. 1 to 3, a display apparatus 10 according to an embodiment of the present disclosure may include a display module 100, a supporting member 300, and a sound generating device 400.

The display module 100 may include a display panel 110. The display panel 110 may display an image (for example, an electronic image or a digital image) and may be implemented as any type of display panel, such as a liquid crystal display panel, an organic light emitting diode (OLED) display panel, an electroluminescent display panel, etc. The display panel 110 may vibrate based on a vibration of the sound generating device 400 to output sound toward a forward direction with respect to the display panel 110. The sound generating device 400 may generate sound using the display panel 110 as a vibration plate. The sound generating device 400 may be referred to as an "actuator," an "exciter," or a "transducer," but is not limited thereto. For example, the sound generating device 400 may be a sound device for outputting sound according to an electrical signal.

For example, the display panel 110 may be a light emitting display panel or a flexible light emitting display panel, but is not limited thereto. The display panel 110 may include a pixel array substrate including a pixel array layer including a plurality of pixels and an encapsulation layer which encapsulates the pixel array layer.

For example, the display panel 110 may display an image in a type such as a top emission type, a bottom emission type, or a dual emission type, based on a structure of a pixel array layer including an anode electrode, a cathode electrode, and an organic compound layer. In the top emission type, visible light emitted from the pixel array layer may be irradiated onto a region in front of a base substrate to allow an image to be displayed, and in the bottom emission type, the visible light emitted from the pixel array layer may be irradiated onto a rearward region behind the base substrate to allow an image to be displayed. In the dual emission type, the visible light emitted from the pixel array layer may be emitted to a forward region and a rearward region with respect to the base substrate.

The plurality of pixels may be respectively in a plurality of pixel areas defined by a plurality of pixel driving lines. Also, each of the plurality of pixels may include a pixel circuit, including at least two thin film transistors (TFTs) and at least one capacitor, and a light emitting device which emits light with a current supplied from the pixel circuit. For example, the light emitting device may include an organic light emitting layer or a quantum dot light emitting layer. As another example, the light emitting device may include a micro light emitting diode (LED), but is not limited thereto.

The encapsulation layer may protect the TFTs and the light emitting device from an external impact and may prevent water or moisture from penetrating into the light emitting device. The encapsulation layer may be replaced with an encapsulation substrate which is attached on the pixel array substrate by a filler surrounding the pixel array. If the filler is a transparent filler, the encapsulation substrate may be a transparent encapsulation substrate.

The display module 100 according to an embodiment of the present disclosure may further include a touch panel 130. The touch panel 130 may include a touch electrode layer which is provided on the display panel 110 and includes a touch electrode for sensing a user touch applied to the display module 100. The touch electrode layer may sense a capacitance variation of the touch electrode caused by the user touch. For example, a mutual capacitance type where a plurality of touch driving electrodes and a plurality of touch sensing electrodes are provided to intersect one another or a self-capacitance type where only a plurality of touch sensing electrodes are provided may be applied, and an adhesive layer may be provided on an upper surface or a lower surface and may be attached on and fixed to an upper element or a lower element.

The display module 100 may further include a polarizing film 150 on the touch panel 130. The polarizing film 150 may be attached on an upper surface of the touch panel 130 by a film attachment member. The polarizing film 150 may circularly polarize external light reflected by the TFT and/or the pixel driving lines on the pixel array substrate, thereby enhancing the visibility and contrast ratio of the display panel 110. The polarizing film 150 may be between the encapsulation layer of the display panel 110 and the touch panel 130.

The display panel 110 may further include a barrier layer between the encapsulation layer of the display panel 110 and the touch panel 130. The barrier layer may prevent water or moisture and the like from penetrating into the pixel array.

The display module 100 may further include a color filter layer on an upper surface of the encapsulation layer of the display panel 110. The color filter layer may include a color filter which is provided to overlap each of the plurality of pixels and transmits only a wavelength of a color set in each of the plurality of pixels.

The supporting member 300 may accommodate the display module 100. In the present specification, the supporting member 300 may be referred to as a "cover bottom," a "plate bottom," a "back cover," a "base frame," a "metal frame," a "metal chassis," a "chassis base," or an "m-chassis." Therefore, the supporting member 300 may be a supporter for supporting the display panel 110 and may be implemented as any type of a frame or a plate structure each disposed on the rear surface of the display apparatus.

For example, the supporting member 300 may include a supporting member rear part 310 and a supporting member side part 330. The supporting member rear part 310 may be on a rear surface of the display module 100 and may cover the rear surface of the display module 100. For example, the supporting member rear part 310 may cover a circuit accommodating space in the rear surface of the display module 100. For example, the supporting member rear part 310 may be formed of the same material as that of a cover window 700, or may be formed of a glass material differing from that of the cover window 700. For example, the supporting member rear part 310 may be a rear cover, but the term is not limited thereto. For example, the supporting member rear part 310 may be provided independently from the supporting member side part 330.

The supporting member side part 330 may surround each of side surfaces of the display module 100 to have a display accommodating space into which the display module 100 is accommodated. The supporting member side part 330 may be provided in a frame shape or a corner-rounded shape, but is not limited thereto. For example, each of side surfaces of the supporting member 300 may be rounded to have a curvature radius, for enhancing a sense of beauty in design of the display apparatus.

The supporting member side part 330 may include first to fourth side surfaces 331 to 334 of the supporting member 300. The first to fourth side surfaces 331 to 334 of the supporting member 300 may provide an accommodating space for accommodating the display module 100. For example, the first to fourth side surfaces 331 to 334 of the supporting member 300 may provide a circuit accommodating space for accommodating peripheral circuits of an electronic device including a battery and a circuit configuration of a driving circuit unit and the like.

The first side surface 331 of the supporting member 300 may be disposed in parallel with a first lengthwise direction X of the display apparatus. For example, the first side surface 331 of the supporting member 300 may be disposed vertical to a first side surface or a first long side of the supporting member rear part 310. The first side surface 331 of the supporting member 300 may surround the first side surface or one widthwise side of the display module 100.

The second side surface 332 of the supporting member 300 may be disposed in parallel with the first side surface 331 of the supporting member 300. For example, the second side surface 332 of the supporting member 300 may be disposed vertical to a second side surface or a second long side of the supporting member rear part 310. The second side surface 332 of the supporting member 300 may surround the second side surface or the other widthwise side of the display module 100.

The third side surface 333 of the supporting member 300 may be disposed in parallel with a second lengthwise direction Y of the display apparatus intersecting the first lengthwise direction X of the display apparatus. For example, the third side surface 333 of the supporting member 300 may be disposed vertical to a third side surface or a first short side of the supporting member rear part 310. The third side surface 333 of the supporting member 300 may surround the third side surface or one lengthwise side of the display module 100.

The fourth side surface 334 of the supporting member 300 may be disposed in parallel with the third side surface 333 of the supporting member 300. For example, the fourth side surface 334 of the supporting member 300 may be disposed vertical to a fourth side surface or a second short side of the supporting member rear part 310. The fourth side surface 334 of the supporting member 300 may surround the fourth side surface or the other lengthwise side of the display module 100.

The sound generating device 400 may be disposed on the rear surface of the display module 100 (for example, the rear surface of the display panel 110) and may vibrate the display module 100 based on a vibration driving signal. Therefore, the sound generating device 400 may output a sound in a forward direction Z with respect to the display panel 110 based on a vibration of the display panel 110.

The supporting member 300 according to an embodiment of the present disclosure may further include a vibration device exposure part in the third side surface 333 of the supporting member 300. For example, the vibration device exposure part may protrude from the third side surface 333 of the supporting member 300 and may be disposed near the sound generating device 400. Therefore, the sound generating device 400 attached on the rear surface of the display module 100 may be exposed at the outside through the vibration device exposure part. Also, a portion of a lower portion of the sound generating device 400 may be inserted or accommodated into the vibration device exposure part. The vibration device exposure part may secure a vibration space for a vibration of the sound generating device 400 disposed in the display module 100, and thus, the display apparatus may be slimmed and the sound generating device 400 may be easily placed. When a distance between the supporting member rear part 310 and the rear surface of the display module 100 is greater than the vibration space, the vibration device exposure part may be omitted.

The sound generating device 400 may be disposed on or coupled to the rear surface of the display panel 110 using an adhesive member 403. The adhesive member 403 may include a double-sided tape, a thermocurable adhesive, a photocurable adhesive, or a naturally curable adhesive, but is not limited thereto. For example, the double-sided tape may include an acrylic-based adhesive in non-woven fabric, but is not limited thereto. For example, the thermocurable adhesive may include epoxy resin, but is not limited thereto. The adhesive member 403 may be disposed on a whole surface of the sound generating device 400, but is not limited thereto. The adhesive member 403 may include a sticking member or an adhesive, but the term is not limited thereto.

With reference to FIGS. 1 to 3, the sound generating device 400 may include a first vibration generating device 401 and a second vibration generating device 402, for improving a sound pressure level in the low frequency domain and the high frequency domain in a sound generating device configured with one vibration generating device. The first vibration generating device 401 may be disposed near the second vibration generating device 402. For example, the first vibration generating device 401 may be surrounded by the second vibration generating device 402 spaced apart therefrom. The second vibration generating device 402 may be formed a closed loop where the second vibration generating device 402 is disposed along an outer portion of the first vibration generating device 401. Therefore, the first vibration generating device 401 may be disposed in an inner region surrounded by the second vibration generating device 402, or may be disposed inside the second vibration generating device 402. The first vibration generating device 401 may be disposed adjacent to the second vibration generating device 402. For example, the second vibration generating device 402 may be spaced apart from the first vibration generating device 401 by a certain interval or distance. When the second vibration generating device 402 is disposed too close to the first vibration generating device 401, a vibration characteristic may be offset by interference between a vibration of the first vibration generating device 401 and a vibration of the second vibration generating device 402, and thus, the first vibration generating device 401 may be spaced apart from the second vibration generating device 402.

A displacement of a center region of the first vibration generating device 401 may be maximized by a signal applied to the sound generating device 400, thereby reinforcing or improving a sound pressure level of a low-pitched sound band. For example, the first vibration generating device 401 may maximize a displacement of a center region of the sound generating device 400 based on a signal applied to the sound generating device 400, thereby reinforcing or improving a sound pressure level of the low-pitched sound band. The second vibration generating device 402 may maximize a vibration of an edge or periphery portion of the display panel 110, thereby reinforcing or improving a sound pressure level of a high-pitched sound band. Therefore, the sound generating device 400 may be configured to output sound of an audible frequency domain, the first vibration generating device 401 may be configured to reinforce a sound of the low-pitched sound band, and the second vibration generating device 402 may be configured to reinforce a sound of the high-pitched sound band. For example, the audible frequency may be 20 Hz to 20 kHz, but is not limited thereto. For example, a middle-pitched sound band may be 200 Hz to 3 kHz, the high-pitched sound band may be 3 kHz or more, and the low-pitched sound band may be 200 Hz or less. However, embodiments are not limited thereto.

The first vibration generating device 401 and the second vibration generating device 402 may have a shape such as a rectangular (e.g., quadrilateral) shape, a quadrate shape, a lozenge shape, or a parallelogram shape, but a shape is not limited thereto.

A protection member may be further provided for protecting the vibration generating devices of the sound generating device 400. The protection member may have a size that is greater than or equal to that of a sound generating device which is a vibration generating device, and may be attached on a rear surface of the sound generating device 400. The protection member may prevent the sound generating device 400 from being damaged by a physical impact and/or an electrical impact such as static electricity. For example, the sound generating device 400 may be damaged by static electricity which occurs in the display module 100 such as a panel driving circuit unit or flows in from the outside, or may be damaged by a physical contact with the supporting member rear part 310 caused by pressing of the display module 100. Therefore, because the protection member is on the rear surface of the sound generating device 400, the protection member may cut off static electricity transferred to the sound generating device 400 through the display module 100 to protect the sound generating device 400 from the static electricity and may protect the sound generating device 400 from a physical impact applied to the sound generating device 400 by the display module 100. The protection member may include a single-sided insulation tape or an insulation single-sided foam tape each including an adhesive layer attached on the sound generating device 400. For example, the protection member may be a polyethylene terephthalate (PET) insulation tape or a polyvinyl chloride (PVC) insulation tape, but is not limited thereto.

The first and second vibration generating devices 401 and 402 may include a piezoelectric material layer having a piezoelectric effect and an electrode disposed at an edge or periphery of the piezoelectric material layer. As another example, the electrode may include an opaque metal material which is relatively low resistance and has good heat dissipation characteristic, but embodiments are not limited thereto. In other embodiments, the electrode may include a transparent conductive material or a conductive polymer material. Each of the first and second vibration generating devices 401 and 402 may include the piezoelectric material layer, and thus, may be referred to as a "piezoelectric device."

The piezoelectric material layer may include a piezoelectric material that vibrates with an electric field. Here, the piezoelectric material may have a characteristic in which as pressure is applied to or twisting occurs in a crystalline structure due to an external force, a potential difference is caused by dielectric polarization based on a relative position change of a positive (+) ion and a negative (−) ion, and vibration occurs due to an electric field based on an applied voltage.

Each of the first and second vibration generating devices 401 and 402 may include a polymer material-piezoelectric material, a thin film material-piezoelectric material, a composite material-piezoelectric material, or a single crystalline ceramic or polycrystalline ceramic-containing piezoelectric material. Examples of the polymer material-containing piezoelectric material may include poly vinylidene fluoride (PVDF), polyvinylidene fluoride trifluoroethylene P(VDF-TrFe), and P(VDFTeFE). Examples of the thin film material-containing piezoelectric material may include ZnO, CdS, and AlN. Examples of the composite material-containing piezoelectric material may include PZT-PVDF, PZT-silicon rubber, PZT-epoxy, PZT-foam polymer, and PZT-foam urethane. Examples of the single crystalline ceramic-containing piezoelectric material may include $\alpha$-AlPO$_4$, $\alpha$-SiO$_2$, LiNbO$_3$, Tb$_2$(MoO$_4$)$_3$, Li$_2$B$_4$O$_7$, and ZnO. Examples of the polycrystalline ceramic-containing piezoelectric material may include a PZT-based material, a PT-based material, a PZT-complex Perovskite-based material, and BaTiO$_3$.

The display apparatus according to an embodiment of the present disclosure may further include a driving circuit unit 600 and a cover window 700.

The driving circuit unit 600 may be in a circuit accommodating space in the support member 300 and may be connected to the display panel 110 and the sound generating device 400. The driving circuit unit 600 may include a panel driving circuit and a sound processing circuit.

The panel driving circuit may be mounted on the display panel 110 or the circuit board to display an image on the display panel 110. The panel driving circuit may be connected to a pad part on the pixel array substrate of the display panel 110 and supply a driving signal and a data signal to the pixel driving lines, thereby displaying an image on each pixel.

The sound processing circuit may generate an audio signal based on an audio source and amplify the audio signal to generate a vibration driving signal. The first and second vibration generating devices 401 and 402 of the sound generating device 400 may be vibrated according to the generated vibration driving signal.

The cover window 700 may be coupled or connected to the supporting member 300 to support the display module 100. The cover window 700 may be formed of glass or a reinforced glass material. For example, the cover window 700 may have either a sapphire glass or a Gorilla glass or a bonding structure thereof. The cover window 700 may be attached to the front surface of the display module 100 via an adhesive member. The adhesive member may be, but is not limited to, an optically clear adhesive (OCA), an optically clear resin (OCR), or a pressure sensitive adhesive (PSA).

The cover window 700 may cover a non-display area, except a display area, of the display module 100. For example, the cover window 700 may include a transparent area overlapping the display area of the display module 100, a light blocking area overlapping the non-display area of the display module 100, and a design layer provided in the light blocking area to cover the non-display area of the display module 100. The cover window 700 may be a support member, a window cover, or the like, and embodiments are not limited to the term.

With reference to FIG. 3, the sound generating device 400 may be on an upper portion of the rear surface of the display panel 110. The display panel 110 may include a first short side, a second short side facing the first short side, and a long side perpendicular to the first short side or the second short side. For example, the first short side and the second short side may be in a widthwise direction of the display panel 110, and the long side may be in a lengthwise direction of the display panel 110. The widthwise direction and the lengthwise direction may be interchangeable. For example, a distance d1 between a center of the first vibration generating device 401 and the first short side of the display panel 110 may be ¼ to ⅓ of the long side of the display panel 110. When the sound generating device 400 is on the upper side of the rear surface of the display panel 110, a sound pressure level may be further improved than when the sound generating device 400 is disposed at the center of the display panel 110.

FIGS. 4A to 4F are diagrams for describing a vibration of a sound generating device according to an embodiment of the present disclosure.

With reference to FIGS. 4A to 4F, two sound processing circuits included in the driving circuit unit 600 may respectively apply a vibration driving signal to the first vibration generating device 401 and the second vibration generating device 402 of the sound generating device 400. An example where each of the first vibration generating device 401 and the second vibration generating device 402 are formed by stacking two layers will be described, but embodiments are not limited thereto. In other embodiments, each of the first vibration generating device 401 and the second vibration generating device 402 are formed by stacking two or more layers. For example, each of the first vibration generating device 401 and the second vibration generating device 402 are formed by stacking four, eight, sixteen, or eighteen layers, and the number of layers is not limited thereto.

Figure 4A:
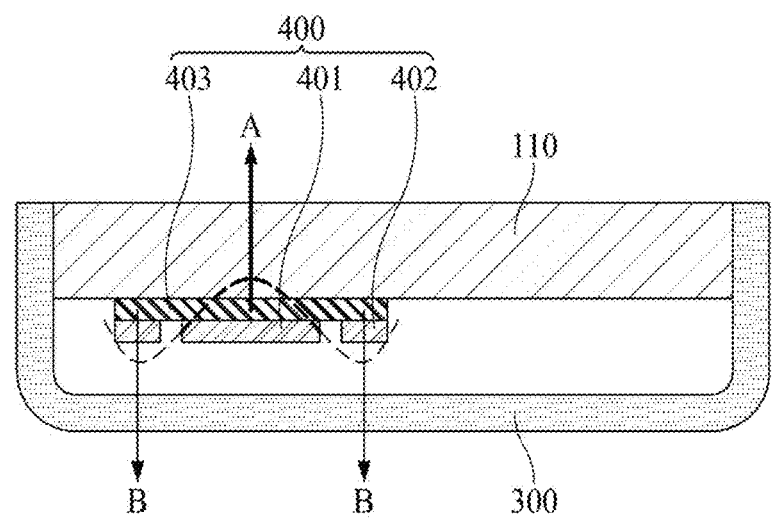
FIGS. 4A to 4F are diagrams for describing a vibration of a sound generating device according to an embodiment of the present disclosure.

With reference to FIG. 4A, when the vibration driving signal is applied to each of the first vibration generating device 401 and the second vibration generating device 402 of the sound generating device 400, the first vibration generating device 401 and the second vibration generating device 402 may vibrate or may be excited at opposite phases. For example, the first vibration generating device 401 may vibrate (illustrated by A) in an upward direction with respect to the display panel 110 with a tensile force, and the second vibration generating device 402 may vibrate (illustrated by B) in a downward direction with respect to the display panel 110 with a compressive force. As another example, the first vibration generating device 401 may be compressed (illustrated by B) in the downward direction with respect to the display panel 110, and the second vibration generating device 402 may be tensioned (illustrated by "A") in the upward direction with respect to the display panel 110. This will be described below.

Figure 4B:
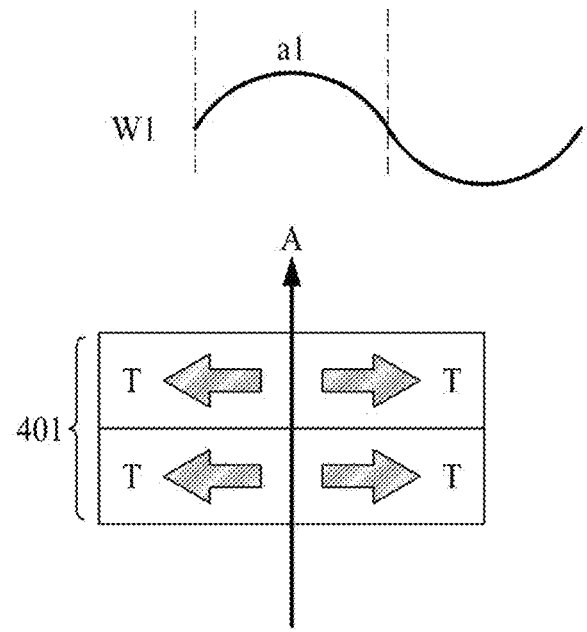
Figure 4C:
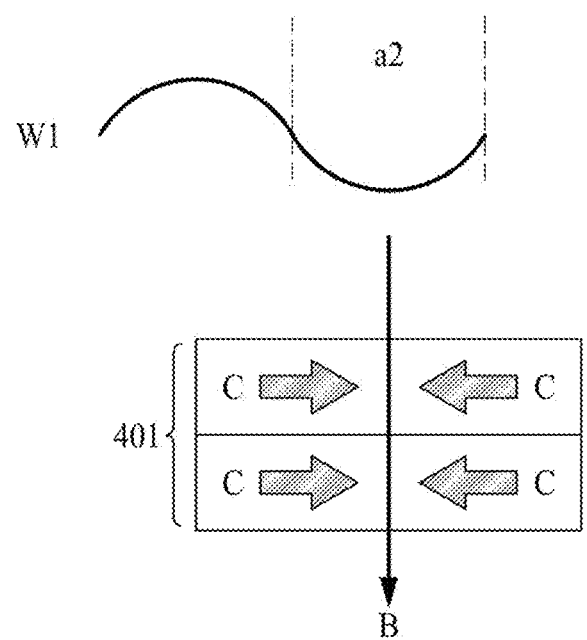

With reference to FIGS. 4B and 4C, an example where a signal having a first phase W1 is applied to the first vibration generating device 401 by the sound processing circuit of the driving circuit unit 600 is illustrated. In a1 of the signal having the first phase W1, tension T may occur in the first vibration generating device 401, and a vibration may occur (illustrated by "A") in an upward direction with respect to the display panel 110. In a2 of the signal having the first phase W1, compression C may occur in the first vibration generating device 401, and a vibration may occur (illustrated by "B") in a downward direction with respect to the display panel 110. Therefore, tension and compression may be repeatedly performed in the first vibration generating device 401, and thus, a vibration may occur in a vertical direction.

Figure 4D:
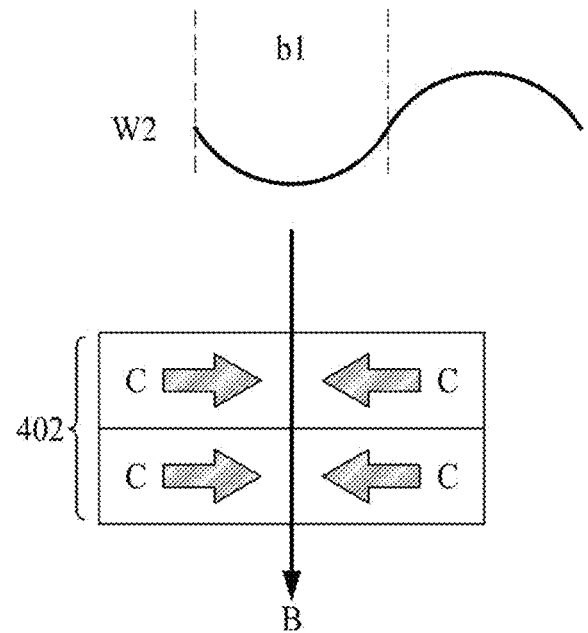
Figure 4E:
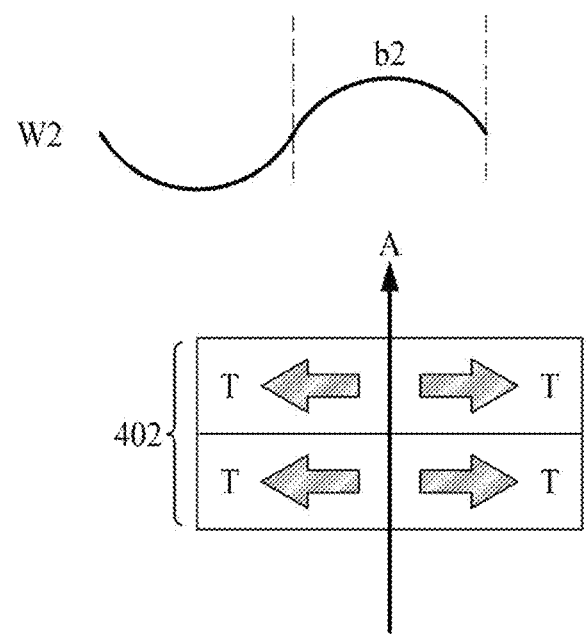

With reference to FIGS. 4D and 4E, an example where a signal having a second phase W2 differing from the first phase W1 is applied to the second vibration generating device 402 by the sound processing circuit of the driving circuit unit 600 is illustrated. In b1 of the signal having the second phase W2, compression C may occur in the second vibration generating device 402, and a vibration may occur (illustrated by "B") in the downward direction with respect to the display panel 110. In b2 of the signal having the second phase W2, tension T may occur, and a vibration may occur (illustrated by "A") in the upward direction with respect to the display panel 110. Therefore, tension and compression may be repeatedly performed in the second vibration generating device 402, and thus, a vibration may occur. The second vibration generating device 402 may vibrate or may be excited at a phase differing from that of the first vibration generating device 401. For example, the first vibration generating device 401 may be tensioned T and thus a vibration may occur in an A direction, and the second vibration generating device 402 may be compressed C and thus a vibration may occur in a B direction. The second phase W2 may differ from the first phase W1. For example, the second phase W2 may be in-phase. A signal applied to FIGS. 4B and 4C may be an in-phase signal, and a signal applied to FIGS. 4D and 4E may be a reversed-phase signal, but the present disclosure is not limited thereto. For example, an out-of-phase signal may be applied to the first sound generating device 401, and an in-phase signal may be applied to the second sound generating device 402. Therefore, compression and tension may be repeatedly performed in the first vibration generating device 401 and thus a vibration may occur in a vertical direction, and tension and compression may be repeatedly performed in the second vibration generating device 402 and thus a vibration may occur in a vertical direction.

Figure 4F:
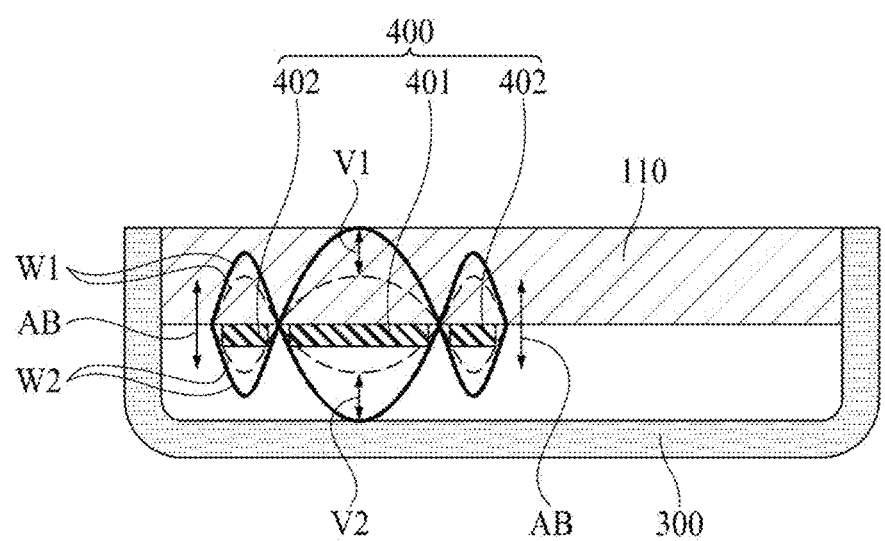

With reference to FIG. 4F, a dotted line represents a displacement of each of the first vibration generating device 401 and the second vibration generating device 402, and a solid line represents a displacement of each of the first vibration generating device 401 and the second vibration generating device 402 after a signal is applied to the first vibration generating device 401 and the second vibration generating device 402. A signal applied to the first vibration generating device 401 is W1, a signal applied to the second vibration generating device 402 is W2, and W1 and W2 may be signals having different phases. When signals having different phases W1 and W2 are applied to the first vibration generating device 401 and the second vibration generating device 402, the first vibration generating device 401 and the second vibration generating device 402 may repeatedly vibrate in an A direction and B direction. For example, the first vibration generating device 401 and the second vibration generating device 402 may vibrate in the A direction and B direction in which tension and compression are repeated, based on a signal applied to the sound generating device. Therefore, comparing with the dotted line, a displacement of a center region of the first vibration generating device 401 may vary by V1 and V2, and thus, may be maximized. A displacement of the first vibration generating device 401 may be maximized based on a vibration, performed in an opposite direction, of the second vibration generating device 402 along with a vibration of the first vibration generating device 401, thereby more reinforcing or enhancing a sound of the low-pitched sound band. Accordingly, a sound of the low-pitched sound band of the sound generating device 400 may be further enhanced. The second vibration generating device 402 may vibrate an edge or periphery of the display panel 110, thereby reinforcing or enhancing a sound of the high-pitched sound band.

Therefore, because signals having different phases are applied to the first vibration generating device 401 and the second vibration generating device 402, the first vibration generating device 401 and the second vibration generating device 402 may vibrate or may be excited in opposite directions. For example, the first vibration generating device 401 may vibrate a center region of the sound generating device 400 using a signal applied to the sound generating device 400. For example, by maximizing a displacement of a center region of the first vibration generating device 401, a sound of the low-pitched sound band may be reinforced or improved. For example, the second vibration generating device 402 may maximize a vibration of an edge or periphery of the display panel 110 to reinforce or improve a sound of the high-pitched sound band. Accordingly, in the sound generating device according to an embodiment of the present disclosure, a sound of the low-pitched sound band and a sound of the high-pitched sound band may be improved or enhanced.

The sound generating device described above with reference to FIGS. 1 to 3 may be applied to a receiver such as an electronic apparatus. A receiver may transfer a call voice based on an electronic apparatus to ears of a user. For example, when the sound generating device is applied to a receiver such as an electronic device, a sound of the low-pitched sound band and a sound of the high-pitched sound band may be improved or enhanced by the first vibration generating device 401 and the second vibration generating device 402 and may be transfer to a user, thereby providing a display apparatus for providing an enhanced call voice to a user.

Figure 5:
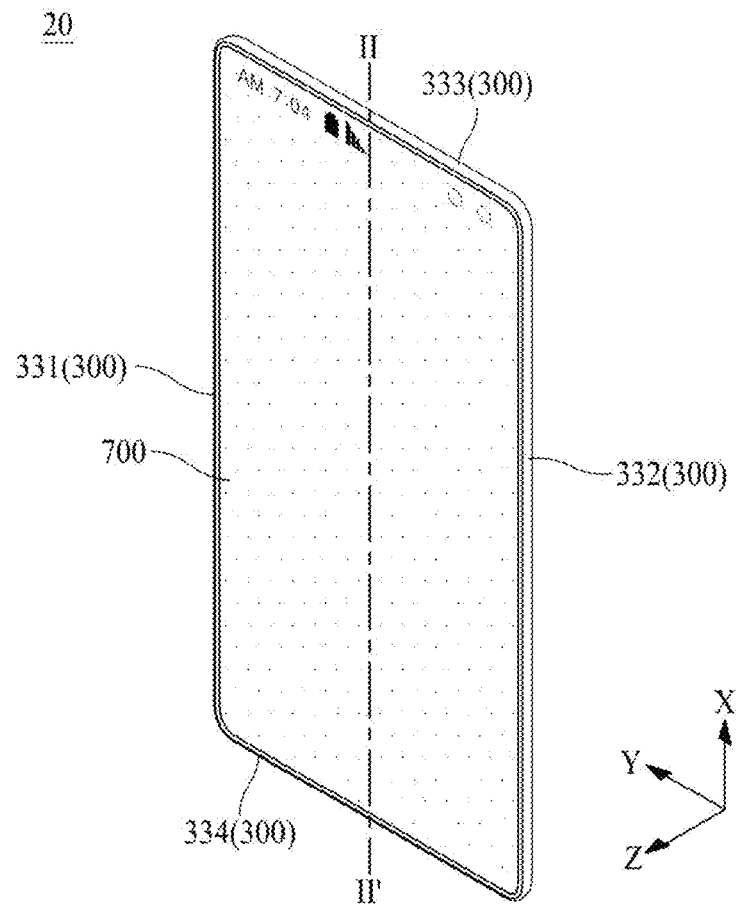
FIG. 5 is a perspective view illustrating a display apparatus according to another embodiment of the present disclosure.
Figure 6:
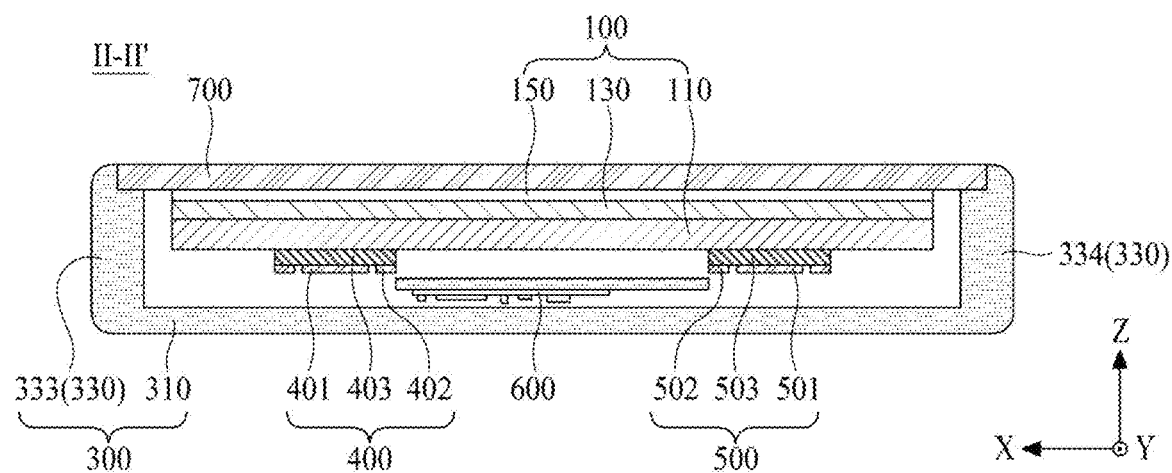
FIG. 6 is a cross-sectional view taken along line II-IF illustrated in FIG. 5.
Figure 7:
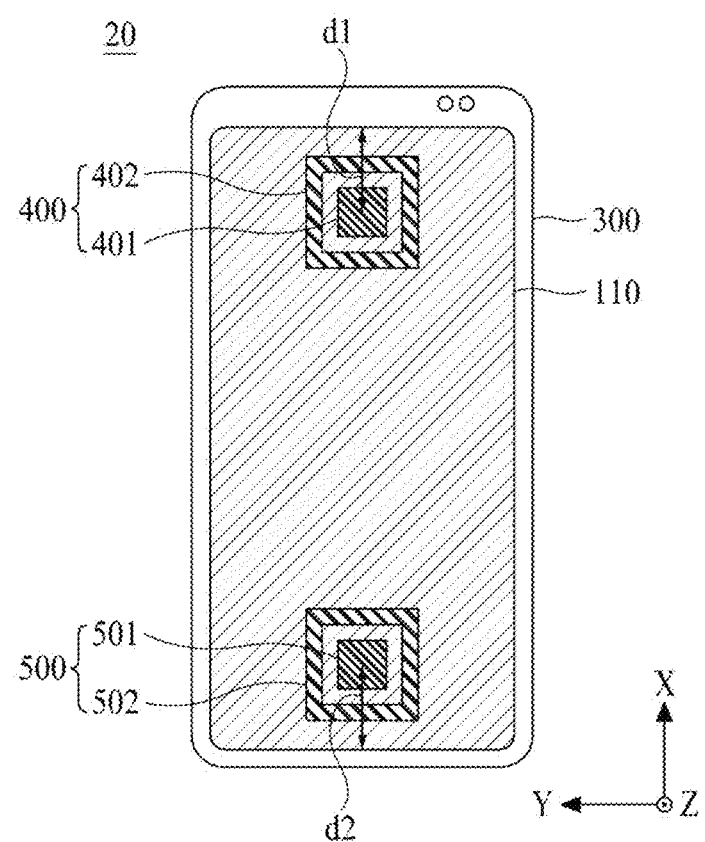
FIG. 7 is a rear view of a display panel illustrated in FIG. 5.

FIG. 5 illustrates a display apparatus 20 according to another embodiment of the present disclosure. FIG. 6 is a cross-sectional view taken along line II-IF illustrated in FIG. 5. FIG. 7 is a rear view of a display panel illustrated in FIG. 5.

With reference to FIGS. 5 to 7, the display apparatus 20 according to another embodiment of the present disclosure may include a display module 100, a supporting member 300, a first sound generating device 400, and a second sound generating device 500. The display module 100 may include a display panel 110. The display module 100, the display panel 110, and the supporting member 300 are as described above with reference to FIGS. 1 to 3, and thus, their descriptions are omitted or will be briefly given below.

With reference to FIGS. 5 to 7, the display apparatus 20 according to an embodiment of the present disclosure may include a first sound generating device 400 and a second sound generating device 500. The sound generating device described above with reference to FIGS. 1 to 3 may be the first sound generating device illustrated in FIGS. 5 to 7. The adhesive member described above with reference to FIGS. 1 to 3 may be an adhesive member illustrated in FIGS. 5 to 7. The second sound generating device 500 may include a third vibration generating device 501 and a fourth vibration generating device 502. The third vibration generating device 501 may be disposed near the fourth vibration generating device 502. For example, the fourth vibration generating device 502 may be formed as a closed loop where the fourth vibration generating device 502 is disposed along an outer portion of the third vibration generating device 501. Therefore, the third vibration generating device 501 may be disposed in an inner region surrounded by the fourth vibration generating device 502, or may be disposed inside the fourth vibration generating device 502. The third vibration generating device 501 may be disposed adjacent to the fourth vibration generating device 502. For example, the fourth vibration generating device 502 may be spaced apart from the third vibration generating device 501 by a certain interval or distance.

Therefore, since signals having different phases are applied to the third vibration generating device 501 and the fourth vibration generating device 502, the third vibration generating device 501 and the fourth vibration generating device 502 may vibrate or may be excited in opposite directions. For example, the third vibration generating device 501 may vibrate a center region of the second sound generating device 500 using a signal applied to the second sound generating device 500. For example, by maximizing a displacement of a center region of the third vibration generating device 501, a sound of the low-pitched sound band may be reinforced or improved. For example, the fourth vibration generating device 502 may maximize a vibration of an edge or periphery of the display panel 110 to reinforce or improve a sound of the high-pitched sound band. Therefore, the second sound generating device 500 may be configured to output a sound of the audible frequency domain, the third vibration generating device 501 may be configured to reinforce a sound of the low-pitched sound band, and the fourth vibration generating device 502 may be configured to reinforce a sound of the high-pitched sound band. Accordingly, in the sound generating device according to an embodiment of the present disclosure, a sound of the low-pitched sound band and a sound of the high-pitched sound band may be improved or enhanced. The third vibration generating device 501 and the fourth vibration generating device 502 are the same as the first vibration generating device 401 and the second vibration generating device 402 described above with reference to FIGS. 1 to 3, and thus, their descriptions are omitted.

The second sound generating device 500 may be disposed on or coupled to a rear surface of the display panel 110 using a second adhesive member 503. The second adhesive member 503 may include a double-sided tape, a thermocurable adhesive, a photocurable adhesive, or a naturally curable adhesive, but is not limited thereto. For example, the double-sided tape may include an acrylic-based adhesive in non-woven fabric, but is not limited thereto. For example, the thermocurable adhesive may include epoxy resin, but is not limited thereto. The second adhesive member 503 may be on a whole surface of the second sound generating device 500, but is not limited thereto. The second adhesive member 503 may include a sticking member or an adhesive, but the term is not limited thereto.

With reference to FIG. 7, the first sound generating device 400 may be on an upper portion of the rear surface of the display panel 110. The display panel 110 may include a first short side, a second short side facing the first short side, and a long side perpendicular to the first short side or the second short side. For example, the first short side and the second short side may be in a widthwise direction of the display panel 110, and the long side may be in a lengthwise direction of the display panel 110. The widthwise direction and the lengthwise direction may be interchangeable. For example, a distance d1 between a center of the first vibration generating device 401 and the first short side of the display panel 110 may be ¼ to ⅓ with respect to the long side of the display panel 110. When the first sound generating device 400 is on the upper portion of the rear surface of the display panel 110, a sound pressure level may be further improved than when the first sound generating device 400 is disposed at a center of the display panel 110. The second sound generating module 500 may be disposed on a lower side of the rear surface of the display panel 110. For example, a distance d2 between a center of the third vibration device 501 and the second short side of the display panel 110 may be ¼ to ⅓ with respect to the long side of the display panel 110. The second short side of the display panel 110 may be a side facing the first short side. The second sound generating device 500 may be disposed to be symmetrical with the first sound generating device 400 with respect to a center of the display module 100.

Figure 8:
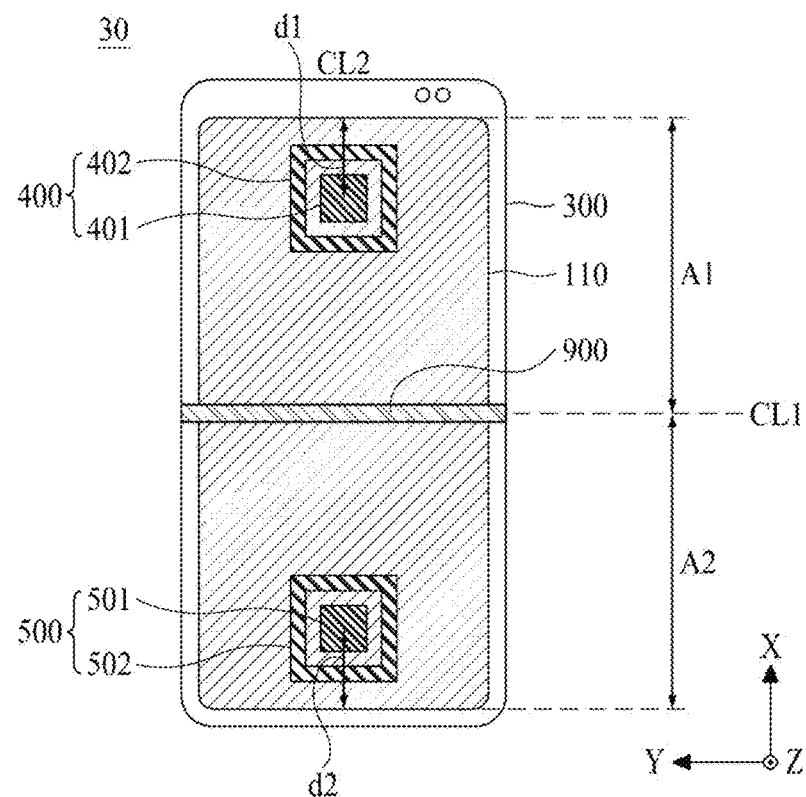
FIG. 8 is a rear view of a display apparatus according to another embodiment of the present disclosure.

FIG. 8 is a rear view of a display apparatus 30 according to another embodiment of the present disclosure.

With reference to FIG. 8, the display apparatus 30 according to another embodiment of the present disclosure may include a first sound generating device 400 and a second sound generating device 500. The first sound generating device 400 may vibrate a first rear region A1 of the display module 100 based on a vibration driving signal provided from the driving circuit unit 600. The first rear region A1 may be a rear right region or a region between a rear center portion or a center portion CL1 of the display module 100 and one short-side of the display module 100 with respect to a lengthwise direction or a long-side direction X of the display module 100. For example, the first rear region A1 may be a right or left periphery region or one periphery region of the display module 100 with respect to the lengthwise direction or the long-side direction X of the display module 100.

The first sound generating device 400 may be disposed on or coupled to the rear surface of the display panel 110 using a first adhesive member 403. The first adhesive member 403 may include a double-sided tape, a thermocurable adhesive, a photocurable adhesive, or a naturally curable adhesive, but is not limited thereto. For example, the double-sided tape may include an acrylic-based adhesive in non-woven fabric, but is not limited thereto. For example, the thermocurable adhesive may include epoxy resin, but is not limited thereto. The first adhesive member 403 may be disposed on a whole surface of the first sound generating device 400, but is not limited thereto.

The second sound generating device 500 may vibrate a second rear region A2 of the display module 100 based on the vibration driving signal provided from the driving circuit unit 600. The second rear region A2 may be a rear left region or a region between the center portion CL1 of the display module 100 and the other short-side of the display module 100 with respect to the lengthwise direction or a long-side direction X of the display module 100. For example, the second rear region A2 may be a left or right periphery region or the other periphery region of the display module 100 with respect to the lengthwise direction or the long-side direction X of the display module 100. The second sound generating device 500 may be disposed to be symmetrical with the first sound generating device 400. For example, the second sound generating device 500 may be disposed to be symmetrical with the first sound generating device 400 with respect to the center portion CL1 of the display module 100.

The second sound generating device 500 may be disposed on or coupled to a rear surface of the display panel 110 using a second adhesive member 503. The second adhesive member 503 may include a double-sided tape, a thermocurable adhesive, a photocurable adhesive, or a naturally curable adhesive, but embodiments are not limited thereto. For example, the double-sided tape may include an acrylic-based adhesive in non-woven fabric, but embodiments are not limited thereto. For example, the thermocurable adhesive may include epoxy resin, but is not limited thereto. The second adhesive member 503 may be disposed on a whole surface of the second sound generating device 500, but embodiments are not limited thereto.

The display apparatus 30 according to an embodiment of the present disclosure may further include a partition 900.

The partition 900 may be disposed in the rear center portion CL1 of the display module 100. For example, the partition 900 may be between the first sound generating device 400 and the second sound generating device 500. For example, the partition 900 may spatially separate or divide the first rear region A1 overlapping the first sound generating device 400 and the second rear region A2 overlapping the second sound generating device 500 at the rear surface of the display panel 110, thereby preventing interference between sounds generated by the first rear region A1 and the second rear region A2. The partition 900 may spatially separate or divide the first rear region A1 and the second rear region A2 in a rear surface of the display module 100 (or the display panel 110) to prevent interference between the sounds generated by the first rear region A1 and the second rear region A2. Accordingly, the partition 900 may separate sounds generated by the first vibration generating device 400 and the second vibration generating device 500 to prevent interference between the generated sounds, thereby allowing a 2.0-channel sound to be output to a forward region with respect to the display module 100 based on a vibration of the display module 100.

The partition 900 may be between the rear surface of the display module 100 and a supporting member rear part 310 of the supporting member 300. A rear surface of the partition 900 may be attached on the supporting member rear part 310 of the supporting member 300, and a front surface of the partition 900 may be attached on the rear surface of the display module 100, may be configured with respect to the rear surface of the display module 100 in a contactless type. For example, the partition 900 may be formed of a double-sided tape, a double-sided foam pad, a single-sided tape, a single-sided foam pad, an adhesive, or a bond, but embodiments are not limited thereto. The partition 900 may be referred to as an "enclosure" or a "baffle," but the term is not limited thereto.

The sound generating device described above with reference to FIGS. 5 to 8 may be applied to a speaker and a receiver such as an electronic apparatus. A receiver may transfer a call voice based on an electronic apparatus to ears of a user. For example, in a case where the first sound generating device 400 operates as a receiver such as an electronic apparatus, the first sound generating device 400 may receive the vibration driving signal from the sound processing circuit. For example, when the first sound generating device 400 is applied to a receiver such as an electronic apparatus, the first sound generating device 400 may transfer a sound of the low-pitched sound band and a sound of the high-pitched sound band, improved by the first vibration generating device 401 and the second vibration generating device 402, to a user, or the user may receive the improved sound of the low-pitched sound band and the improved sound of the high-pitched sound band, thereby providing a display apparatus for providing an enhanced call voice to a user. For example, when each of the first and second sound generating devices 400 and 500 operates as a speaker such as an electronic apparatus, each of the first and second sound generating devices 400 and 500 may receive the vibration driving signal from the sound processing circuit. Accordingly, a sound of the low-pitched sound band and a sound of the high-pitched sound band improved by the first vibration generating device 401 and the second vibration generating device 402 may be transferred to the user.

Figure 9:
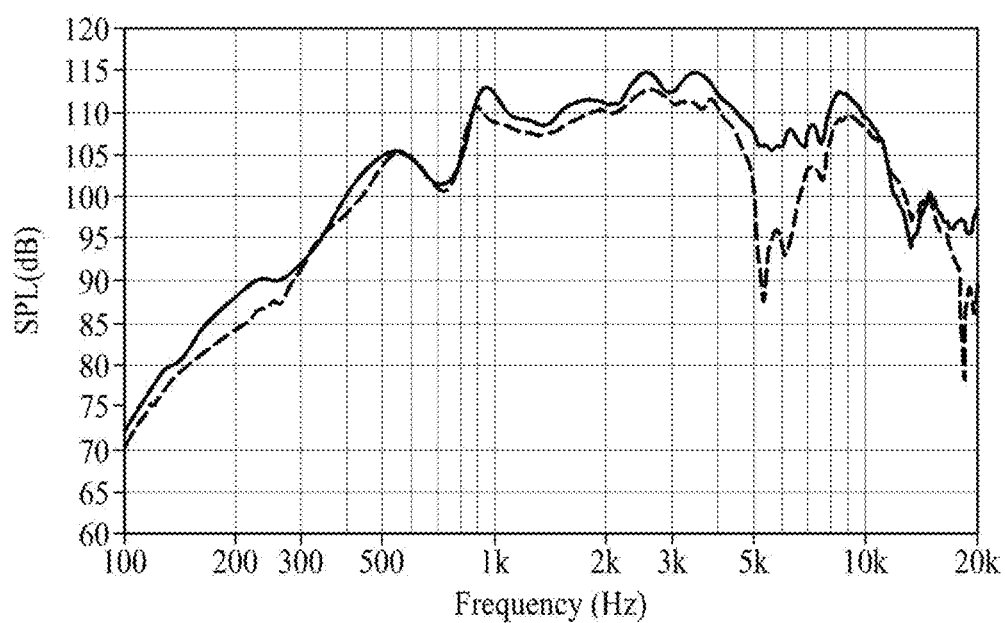
FIG. 9 illustrates a sound output characteristic of a display apparatus according to an embodiment of the present disclosure.

FIG. 9 illustrates a sound output characteristic of a display apparatus according to an embodiment of the present disclosure.

In FIG. 9, a dotted line shows a sound output characteristic of a sound generating device configured with one vibration generating device, and a solid line shows a sound output characteristic of the sound generating device of FIG. 2 according to an embodiment of the present disclosure. The abscissa axis represents a frequency (Hz), and the ordinate axis represents a sound pressure level (SPL) (dB).

The sound output characteristic may be measured by a sound analysis apparatus. The sound analysis apparatus may include a sound card which transmits or receives a sound to or from a control personal computer (PC), an amplifier which amplifies a signal generated from the sound card and transfers the amplified signal to the sound generating device, and a microphone which collects a sound generated by the sound generating device in a display panel. The sound collected through the microphone may be input to the control PC through the sound card, and a control program may check the input sound to analyze the sounds of the sound generating device.

A sound generating device configured with one vibration generating device and a vibration generating device of a sound generating device according to an embodiment of the present disclosure are formed of PZT, and an adhesive member is formed of a double-sided tape. A first vibration generating device and a second vibration generating device according to an embodiment of the present disclosure are disposed apart from each other. A sound output characteristic has been measured in an anechoic chamber which is closed in all directions, and measurement equipment has used Audio Precision company's APX525. Measurement has been performed under a condition where a driving voltage is 30 Vpp and a sound pressure level measurement distance to a display panel is about 1 cm. An applied frequency signal has been applied as a sine sweep within a range of 20 Hz to 20 kHz, and ⅓ octave smoothing has been performed on a measurement result. A measurement method is not limited thereto.

With reference to FIG. 9, in comparison with the sound generating device configured with one vibration generating device, it may be seen that the sound generating device according to an embodiment of the present disclosure provides a sound pressure level which is enhanced in 200 Hz or less corresponding to the low-pitched sound band. For example, comparing with the sound generating device configured with one vibration generating device, it may be seen that the sound generating device according to an embodiment of the present disclosure provides a sound pressure level which is enhanced by 4 dB or more with respect to a frequency of about 200 Hz. In comparison with the sound generating device configured with one vibration generating device, it may be seen that the sound generating device according to an embodiment of the present disclosure provides a sound pressure level which is enhanced in 3 kHz or more corresponding to the high-pitched sound band. For example, comparing with the sound generating device configured with one vibration generating device, it may be seen that a dipping phenomenon where a low-pitched sound pressure level occurs in a frequency of about 5 kHz does not occur in the sound generating device according to an embodiment of the present disclosure. For example, comparing with the sound generating device configured with one vibration generating device, it may be seen that the sound generating device according to an embodiment of the present disclosure provides a sound pressure level which is enhanced by 20 dB or more with respect to a frequency of about 5 kHz.

Therefore, according to the embodiments of the present disclosure, a display apparatus for enhancing a sound pressure level in a low frequency and a high frequency may be implemented.

A sound generating device according to an embodiment of the present disclosure may be applied as a sound generating device in a display apparatus. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, TVs, wall paper display apparatuses, signage apparatuses, game machines, notebook computers, monitors, cameras, camcorders, home appliances, etc. Also, the sound generating device according to an embodiment of the present disclosure may be applied to organic light emitting lighting apparatuses or inorganic light emitting lighting apparatuses. When the sound generating device is applied to a lighting apparatus, the sound generating device may act as lighting and a speaker. The sound generating device according to an embodiment of the present disclosure may be applied to a receiver and/or a speaker such as an electronic apparatus.

A display apparatus according to an embodiment of the present disclosure will be described below.

According to an embodiment of the present disclosure, a display apparatus includes a display module including a display panel configured to display an image and a first sound generating device on a rear surface of the display panel, wherein the first sound generating device includes a first vibration generating device and a second vibration generating device adjacent to the first vibration generating device, and the first vibration generating device vibrates a center region of the first sound generating device based on a signal applied to the first sound generating device and the second vibration generating device is configured to vibrate a periphery of the display panel based on the applied signal.

For example, in the display apparatus according to an embodiment of the present disclosure, the first vibration generating device may be surrounded by the second vibration generating device spaced apart from the first vibration generating device.

For example, in the display apparatus according to an embodiment of the present disclosure, a phase of a signal applied to the first vibration generating device may be opposite to a phase of a signal applied to the second vibration generating device.

For example, in the display apparatus according to an embodiment of the present disclosure, the first vibration generating device may be configured to improve a sound of a low-pitched sound band, and the second vibration generating device may be configured to improve a sound of a high-pitched sound band.

For example, in the display apparatus according to an embodiment of the present disclosure, the first vibration generating device and the second vibration generating device may include a piezoelectric material layer.

For example, in the display apparatus according to an embodiment of the present disclosure, the display panel may include a first short side, a second short side facing the first short side, and a long side perpendicular to the first short side or the second short side, and a distance between a center of the first vibration generating device and the first short side of the display panel may be ¼ to ⅓ with respect to the long side of the display panel.

For example, a display apparatus according to an embodiment of the present disclosure may further include a second sound generating device spaced apart from the first sound generating device in the rear surface of the display panel, the second sound generating device including a fourth vibration generating device and a third vibration generating device surrounded by the fourth vibration generating device spaced from the fourth vibration generating device.

For example, in the display apparatus according to an embodiment of the present disclosure, a phase of a signal applied to the third vibration generating device may be opposite to a phase of a signal applied to the fourth vibration generating device.

For example, in the display apparatus according to an embodiment of the present disclosure, the display panel may include a first short side, a second short side facing the first short side, and a long side perpendicular to the first short side or the second short side, and a distance between a center of the third vibration generating device and the second short side of the display panel may be ¼ to ⅓ with respect to the long side of the display panel.

For example, in the display apparatus according to an embodiment of the present disclosure, the first sound generating device may be disposed to be symmetrical with the second sound generating device with respect to a center portion of the display module.

For example, a display apparatus according to an embodiment of the present disclosure may further include a partition in a rear center portion of the display module.

For example, in the display apparatus according to an embodiment of the present disclosure, the display module may include a first rear region overlapping the first sound generating device and a second rear region overlapping the second sound generating device, and the partition may be disposed between the first rear region and the second rear region.

For example, a display apparatus according to an embodiment of the present disclosure may further include a supporting member configured to accommodate the display module, the supporting member including a vibration device exposure part protruding from the supporting member, the first sound generating device may be accommodated into the vibration device exposure part.

According to an embodiment of the present disclosure, a display apparatus includes a display module including a display panel configured to display an image and a first sound generating device on a rear surface of the display panel, wherein the first sound generating device includes a first vibration generating device and a second vibration generating device being configured to vibrate at a phase differing from a phase of the first vibration generating device.

For example, in the display apparatus according to an embodiment of the present disclosure, one of the first vibration generating device and the second vibration generating device may be configured to vibrate a reversed phase.

For example, in the display apparatus according to an embodiment of the present disclosure, the first vibration generating device may be surrounded by the second vibration generating device spaced apart from the first vibration generating device.

For example, in the display apparatus according to an embodiment of the present disclosure, the first sound generating device may be configured to output a sound of an audible frequency domain, the first vibration generating device may be configured to reinforce a sound of a low-pitched sound band, and the second vibration generating device may be configured to reinforce a sound of a high-pitched sound band.

For example, in the display apparatus according to an embodiment of the present disclosure, the display panel may include a first short side, a second short side facing the first short side, and a long side perpendicular to the first short side or the second short side, and a distance between a center of the first vibration generating device and the first short side of the display panel may be ¼ to ⅓ with respect to the long side of the display panel.

For example, a display apparatus according to an embodiment of the present disclosure may further include a second sound generating device spaced apart from the first sound generating device in the rear surface of the display panel, the second sound generating device including a fourth vibration generating device and a third vibration generating device surrounded by the fourth vibration generating device spaced apart from the fourth vibration generating device.

For example, in the display apparatus according to an embodiment of the present disclosure, the second sound generating device may be configured to output sound of an audible frequency domain, the third vibration generating device may be configured to reinforce a sound of a low-pitched sound band, and the fourth vibration generating device may be configured to reinforce a sound of a high-pitched sound band.

For example, in the display apparatus according to an embodiment of the present disclosure, the display panel may include a first short side, a second short side facing the first short side, and a long side perpendicular to the first short side or the second short side, and a distance between a center of the third vibration generating device and the second short side of the display panel may be ¼ to ⅓ with respect to the long side of the display panel.

For example, in the display apparatus according to an embodiment of the present disclosure, the first sound generating device may be disposed to be symmetrical with the second sound generating device with respect to a center portion of the display module.

For example, a display apparatus according to an embodiment of the present disclosure may further include a partition in a rear center portion of the display module.

For example, in the display apparatus according to an embodiment of the present disclosure, the display module may include a first rear region overlapping the first sound generating device and a second rear region overlapping the second sound generating device, and the partition may be between the first rear region and the second rear region.

For example, a display apparatus according to an embodiment of the present disclosure may further include a supporting member configured to accommodate the display module, the supporting member including a vibration device exposure part protruding from the supporting member, the first sound generating device may be accommodated into the vibration device exposure part.

As described above, the display apparatus according to the embodiments of the present disclosure may include the sound generating device which vibrates the display panel to generate a sound, and thus, may output the sound to a forward region in front of the display panel. Accordingly, an immersion experience of a viewer watching an image displayed by the display apparatus may be enhanced.

Moreover, according to the embodiments of the present disclosure, the sound generating device may include the first vibration generating device and the second vibration generating device, thereby providing a display apparatus for enhancing a sound pressure level corresponding to a low frequency domain and a high frequency domain.

It will be apparent to those skilled in the art that various modifications and variations may be made in the display apparatus of the present disclosure without departing from the technical idea or scope of the disclosures. Thus, it is intended that embodiments of the present disclosure cover the modifications and variations of the disclosure provided they come within the scope of the appended claims and their equivalents.

What is claimed is:

1. A display apparatus, comprising:
   a display module comprising a display panel configured to display an image; and
   a first sound generating device on a rear surface of the display panel,
   wherein the first sound generating device comprises:
   a first vibration generating device; and
   a second vibration generating device adjacent to the first vibration generating device,
   wherein the first vibration generating device is configured to vibrate a center region of the first sound generating device based on a signal applied to the first sound generating device,
   wherein the second vibration generating device is configured to vibrate a periphery of the display panel based on the applied signal,
   wherein the first vibration generating device is surrounded by the second vibration generating device,
   wherein the first vibration generating device is configured to improve a sound of a low-pitched sound band, and
   wherein the second vibration generating device is configured to improve a sound of a high-pitched sound band.

2. The display apparatus of claim 1, wherein the first vibration generating device is spaced apart from the first vibration generating device.

3. The display apparatus of claim 1, wherein a phase of a signal applied to the first vibration generating device is opposite to a phase of a signal applied to the second vibration generating device.

4. The display apparatus of claim 1, wherein each of the first vibration generating device and the second vibration generating device comprises a piezoelectric material layer.

5. The display apparatus of claim 1, wherein:
   the display panel comprises:
   a first short side;
   a second short side facing the first short side; and
   a long side perpendicular to the first short side or the second short side; and
   a distance between a center of the first vibration generating device and the first short side of the display panel is ¼ to ⅓ with respect to the long side of the display panel.

6. The display apparatus of claim 1, further comprising:
   a supporting member configured to accommodate the display module, the supporting member including a vibration device exposure part protruding from the supporting member,
   wherein the first sound generating device is accommodated into the vibration device exposure part.

7. A display apparatus, comprising:
   a display module comprising a display panel configured to display an image;
   a first sound generating device on a rear surface of the display panel, wherein the first sound generating device comprises:
a first vibration generating device; and
a second vibration generating device adjacent to the first vibration generating device,
wherein the first vibration generating device is configured to vibrate a center region of the first sound generating device based on a signal applied to the first sound generating device,
wherein the second vibration generating device is configured to vibrate a periphery of the display panel based on the applied signal, and
wherein the first vibration generating device is surrounded by the second vibration generating device; and
a second sound generating device spaced apart from the first sound generating device in the rear surface of the display panel, the second sound generating device comprising:
a fourth vibration generating device; and
a third vibration generating device surrounded by the fourth vibration generating device spaced apart from the fourth vibration generating device.

8. The display apparatus of claim 7, wherein a phase of a signal applied to the third vibration generating device is opposite to a phase of a signal applied to the fourth vibration generating device.

9. The display apparatus of claim 7, wherein:
the display panel comprises:
a first short side;
a second short side facing the first short side; and
a long side perpendicular to the first short side or the second short side; and
a distance between a center of the third vibration generating device and the second short side of the display panel is ¼ to ⅓ with respect to the long side of the display panel.

10. The display apparatus of claim 7, wherein the first sound generating device is disposed to be symmetrical with the second sound generating device with respect to a center portion of the display module.

11. The display apparatus of claim 7, further comprising a partition in a rear center portion of the display module.

12. The display apparatus of claim 11, wherein:
the display module comprises:
a first rear region overlapping the first sound generating device; and
a second rear region overlapping the second sound generating device; and
the partition is between the first rear region and the second rear region.

13. A display apparatus, comprising:
a display module comprising a display panel configured to display an image;
a first sound generating device on a rear surface of the display panel,
wherein the first sound generating device comprises:
a first vibration generating device; and
a second vibration generating device configured to vibrate at a phase differing from a phase of the first vibration generating device, and
wherein the first vibration generating device is surrounded by the second vibration generating device; and
a second sound generating device spaced apart from the first sound generating device in the rear surface of the display panel, the second sound generating device comprising:
a fourth vibration generating device; and
a third vibration generating device surrounded by the fourth vibration generating device, and spaced apart from the fourth vibration generating device.

14. The display apparatus of claim 13, wherein one of the first vibration generating device and the second vibration generating device is configured to vibrate a reversed phase.

15. The display apparatus of claim 13, wherein the first vibration generating device is spaced apart from the first vibration generating device.

16. The display apparatus of claim 13, wherein:
the first sound generating device is configured to output a sound of an audible frequency domain;
the first vibration generating device is configured to reinforce a sound of a low-pitched sound band; and
the second vibration generating device is configured to reinforce a sound of a high-pitched sound band.

17. The display apparatus of claim 13, wherein:
the display panel comprises:
a first short side;
a second short side facing the first short side; and
a long side perpendicular to the first short side or the second short side; and
a distance between a center of the first vibration generating device and the first short side of the display panel is ¼ to ⅓ with respect to the long side of the display panel.

18. The display apparatus of claim 13, wherein:
the second sound generating device is configured to output a sound of an audible frequency domain;
the third vibration generating device is configured to reinforce a sound of a low-pitched sound band; and
the fourth vibration generating device is configured to reinforce a sound of a high-pitched sound band.

19. The display apparatus of claim 4 wherein:
the display panel comprises:
a first short side;
a second short side facing the first short side; and
a long side perpendicular to the first short side or the second short side; and
a distance between a center of the third vibration generating device and the second short side of the display panel is ¼ to ⅓ with respect to the long side of the display panel.

20. The display apparatus of claim 13, wherein the first sound generating device is disposed to be symmetrical with the second sound generating device with respect to a center portion of the display module.

21. The display apparatus of claim 13, further comprising a partition in a rear center portion of the display module.

22. The display apparatus of claim 21, wherein:
the display module comprises:
a first rear region overlapping the first sound generating device; and
a second rear region overlapping the second sound generating device; and
the partition is between the first rear region and the second rear region.

23. The display apparatus of claim 13, further comprising:
a supporting member configured to accommodate the display module, the supporting member including a vibration device exposure part protruding from the supporting member,
wherein the first sound generating device is accommodated into the vibration device exposure part.

* * * * *